Figure 1:
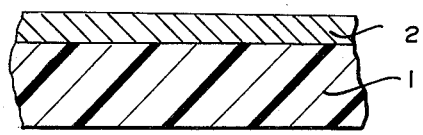

Sept. 11, 1962    E. S. MACKEY ETAL    3,053,662
ANTI-STATIC PHOTOGRAPHIC FILM
Filed Sept. 25, 1958

INVENTORS
E. SCUDDER MACKEY
RAY E. RICE
BY
ATTORNEYS 3,053,662
ANTI-STATIC PHOTOGRAPHIC FILM
E. Scudder Mackey and Ray E. Rice, Binghamton, N.Y., assignors to General Aniline & Film Corporation, New York, N.Y., a corporation of Delaware
Filed Sept. 25, 1958, Ser. No. 763,342
12 Claims. (Cl. 96—87)

This invention relates to a photographic film. More particularly this invention relates to a photographic film having a coating thereon which imparts anti-static properties to the film.

A great amount of trouble is caused during the manufacture or use of photographic film on account of the accumulation of electrical charges on the film. These electrical charges are known as static and may be caused by friction of the film against the rolls or other portions of the machines through which it passes or merely by contact with dissimilar surfaces or by handling by personnel who may be packing, inspecting or loading film for processing. Static discharges in an unexposed film manifest themselves by the formation of irregular streaks or lines caused by exposure of the emulsion at such portions. Attempts to overcome static in photographic films have, for the most part, followed the lines of applying conducting or hydroscopic materials to the surface of the film in order to increase its electrical conductivity.

The principal object of the present invention is to provide a photographic film with a layer containing a material capable of reducing or eliminating static.

A further object of this invention is to provide a photographic film with a layer having incorporated therein a material which has the ability to become molecularly oriented on the surface in such a way that it provides a film which affords dielectric shielding particularly against such static discharge which occurs during human hand handling.

Other objects and advantages of this invention will become apparent to those skilled in the art from the detailed description given below.

The objects of our invention are accomplished by incorporating in layers of the film or on the surface of the film a colloidal solution of hydrated silica or a polymerized form of silicic acid in solution. These forms of silica are commercially known as Du Pont Ludox LS, Ludox SM and Ludox HS, all of which are faintly opalescent aqueous sols. The particles are discrete, uniform spheres of silica which have been stabilized by incorporating a small amount of alkali in the product and are negatively charged.

Characteristic physical properties and chemical composition of the three products are as follows:

| | Ludox SM | Ludox LS | Ludox HS |
|---|---|---|---|
| Percent Colloidal Silica as SiO₂ | 15.0 | 30.0 | 30.0 |
| Surface area B.E.T. method m.²/g. silica | 400 | 210 | 210 |
| Approximate particle diameter (mμ) | 7 | 15 | 15 |
| Ratio, wt., SiO₂/Na₂O | 155 | 285 | 95 |
| Viscosity at 25° C., cps | 4.3 | 13 | 3.6 |
| pH at 25° C | 8.5 | 8.4 | 9.8 |
| Turbidity (Fisher Electrophotometer 525B filter) | 6 | 17 | 21 |

The production of these materials forms no part of our invention.

We contemplate applying these materials or agents to the film in various ways to decrease or eliminate static. They may be applied (1) as a constituent of the sensitive emulsion or (2) as a constituent of a surface layer over the emulsion or the non-curl layer applied to the film-base. We prefer to use them in combination with certain well-known anti-static agents such as the taurines (sulfonated amides) corresponding to the formula

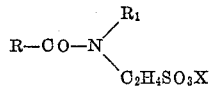

wherein R—CO denotes a radical of a fatty acid of vegetable origin and $R_1$ may be either hydrogen, an aliphatic straight chain radical, an aliphatic-aromatic radical or an aromatic radical and X is either hyrogen, an alkali metal or an organic base radical. The total number of carbon atoms in said taurine compound is at least eight. The use of the taurines as anti-static agents is described in U.S. Patent 2,139,778. This patent particularly describes elimination of static during the manufacturing operation, but neither the compounds described in the patent nor reduction of this type of static forms a part of our invention. We have found that the colloidal silicas are particularly effective in reducing static caused by human hand handling hereafter referred to as handling static—for example, when film is loaded by hand into processing racks, handling static occurs. The sulfonated amides described in the above patent are not effective in reducing this form of static discharge. On the other hand the colloidal silica is not effective in reducing the static of manufacturing origin—for example, during the coating or slitting operation. It is obvious to those skilled in the art that the combination of anti-static agents would be most desirable to provide static reduction in both the situations described above. However, our invention is not limited by the combination as the colloidal silica is effective in reducing handling static when incorporated in the gelatin as the sole anti-static agent.

We are unable to explain the unique action of the colloidal silica since it does not influence surface resistivity (conductivity) nor does the nylon rub static generating apparatus (a modification of the instrument mentioned in R. D. Fines, "Anti-Static Specialty Products Open New Markets," paper delivered at the Chemical Specialties Manufacturers Association meeting May 17, 1955), show that the colloidal silica produces a reduction in the static susceptibility of the film. However, if tested by rubbing the photographic material containing the colloidal silica with human hands, a very marked reduction in static discharge is recorded.

The silicious material may be used, according to our invention, in concentrations of 3.0% to 120% dry weight based on the dry weight of the gelatin used in the photographic film. We prefer to use 50% to produce the anti-static effect.

The following example illustrates a method of applying the anti-static materials to the film according to our invention. It is to be understood, however, that this example is given by way of illustration only and not by way of limitation.

*Example*

A sensitive photographic film having on one side the usual sensitive silver halide emulsion layer is surface coated with a 2% gelatin solution containing a suitable spreading agent and 50% dry weight of Ludox LS (based on dry gelatin weight). Another portion of the sensitive emulsion is coated with a surface layer of gelatin without the Ludox LS. (It is to be understood that certain film such as X-ray may be sensitive emulsion coated on both sides of the base so there would be a surface coating on both sides.) Sections of the coated and dried film containing and not containing our anti-static agents were conditioned at standard humidities (usually 20% and 40%) and tested for handling static. This was done by rubbing each sheet of film a specific number of times with the hand (simulating processing rack loading whereby the hands are rubbed around the film to assure proper loading in the racks).

The test sections were then processed and examined for static discharge which can readily be noted by the black streaks, specks, lines, or various other patterns in the otherwise clear section. The film containing no anti-static treatment where rubbed was completely covered with the static discharge and would be unusable. The sections containing the anti-static agents of our invention had practically no static discharge recording and in normal handling humidities (40–60%) were entirely free of such defects whereas the sections which did not contain our novel anti-static agent had objectionable static discharge recording.

Our invention may be used with any known photographic film base, such as cellulose nitrate, a cellulose ester such as cellulose acetate, cellulose acetate propionate, cellulose acetate butyrate and the like.

Figure 2:
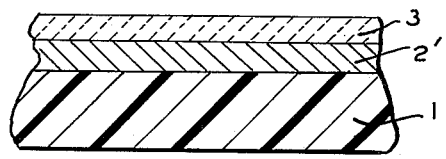
Figure 3:
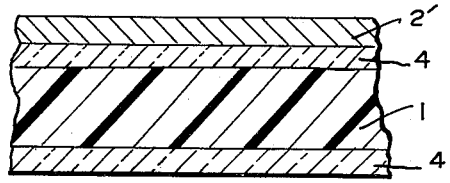

The drawing illustrates some of the various ways in which our novel anti-static agent may be incorporated in a photographic film. In the drawing FIG. 1 shows a cross sectional view of our novel film with the anti-static agent of our invention incorporated in the light-sensitive emulsion layer;

FIG. 2 is a view similar to FIG. 1 showing the anti-static agent of our invention incorporated in a separate surface layer over the emulsion, and FIG. 3 is a view similar to FIG. 1 showing the anti-static agent of our invention incorporated in a layer on each face of the film base.

Similar reference characters represent similar elements in the various views.

Referring to FIG. 1, there is shown a base 1 having a layer of emulsion 2 thereon. The emulsion layer 2 contains the colloidal silicious material of our invention incorporated therein.

In FIG. 2 the base 1 is coated with an emulsion layer 2' which in turn is overcoated with a layer 3 having the antistatic agent of our invention incorporated therein.

In FIG. 3 is shown the base having on each face thereof a layer 4 containing the anti-static material of our invention, one of the layers 4 being overcoated with the usual emulsion layer. One or both of the layers 4 may be of a material which minimizes curling of the film. The anti-static layer of our invention may be incorporated in any one or all of the layers 2' or 4.

Our invention is not limited to the detailed description thereof as given above, but includes all modifications which fall within the scope of the appended claims.

We claim:

1. A photographic film having a layer thereon containing gelatin and an anti-static agent selected from the group consisting of hydrated silica and polymerized silicic acid having a particle size of 7 to 15 m$\mu$, uniformly distributed in said layer, said agent comprising the solid contents of an aqueous sol of said agent containing an $SiO_2/Na_2O$ ratio by weight of 95 to 285.

2. A photographic film as recited in claim 1 wherein said layer constitutes a light-sensitive photographic emulsion.

3. A photographic film comprising a base, a light-sensitive photographic emulsion layer and an anti-static layer containing gelatin and an anti-static agent selected from the group consisting of hydrated silica and polymerized silicic acid having a particle size of 7 to 15 m$\mu$, said agent comprising the solid contents of an aqueous sol of said agent containing an $SiO_2/Na_2O$ ratio by weight of 95 to 285.

4. A photographic film as recited in claim 3 wherein the anti-static layer is positioned on the photographic emulsion layer.

5. A photographic film recited in claim 3 wherein the anti-static layer is positioned between the base and the photographic emulsion layer.

6. A photographic film as recited in claim 3 wherein the amount of anti-static agent in the anti-static layer constitutes from 3% to 120% based on the dry weight of the gelain.

7. A photographic film as recited in claim 6 wherein the anti-static agent constitutes 50% based on the dry weight of the gelain.

8. A photographic film comprising a base, a light-sensitive photographic emulsion layer and an anti-static layer, said anti-static layer containing a tauride corresponding to the formula

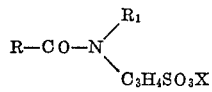

wherein R—CO denotes a radical of a fatty acid of vegetable origin, $R_1$ is selected from the group consisting of hydrogen, aliphatic straight-chain radicals, aliphatic-aromatic radicals and aromatic radicals and X is selected from the group consisting of hydrogen, an alkali metal and an organic base radical in which tauride the total number of carbon atoms is at least eight, said anti-static layer also containing a material selected from the group consisting of hydrated silica and polymerized silicic acid having a particle size of 7 to 15 m$\mu$, said agent comprising the solid contents of an aqueous sol of said agent containing an $SiO_2/Na_2O$ ratio by weight of 95 to 285.

9. A photographic film comprising a base, a light-sensitive silver halide emulsion layer thereon and a layer capable of minimizing curling of said film, said last mentioned layer containing an anti-static agent selected from the group consisting of hydrated silica and polymerized silica acid having a particle size of 7 to 15 m$\mu$, said agent comprising the solid contents of an aqueous sol of said agent containing an $SiO_2/Na_2O$ ratio by weight of 95 to 285.

10. A photographic film as recited in claim 9 wherein the base is a cellulose ester.

11. A photographic film as recited in claim 9 wherein the anti-static agent is hydrated silica.

12. A photographic film as recited in claim 9 wherein the anti-static agent is polymerized silicic acid.

References Cited in the file of this patent

UNITED STATES PATENTS

| | | |
|---|---|---|
| 1,982,778 | Andersen | Dec. 4, 1934 |
| 2,993,793 | Beersmann | July 25, 1961 |

FOREIGN PATENTS

| | | |
|---|---|---|
| 535,374 | Great Britain | Apr. 8, 1941 |
| 581,751 | Great Britain | Oct. 23, 1946 |
| 616,563 | Great Britain | Jan. 24, 1949 |